United States Patent
Hansen

(10) Patent No.: US 8,109,563 B2
(45) Date of Patent: Feb. 7, 2012

(54) SAFETY SEAT HAVING A VERTICALLY ACTING, IMPACT-DAMPENING SUSPENSION

(75) Inventor: Holger Hansen, Hamburg (DE)

(73) Assignee: AutoFlug GmbH (DE)

( * ) Notice: Subject to any disclaimer, the term of this patent is extended or adjusted under 35 U.S.C. 154(b) by 280 days.

(21) Appl. No.: 12/596,140

(22) PCT Filed: Apr. 17, 2008

(86) PCT No.: PCT/EP2008/003065
§ 371 (c)(1),
(2), (4) Date: Oct. 15, 2009

(87) PCT Pub. No.: WO2008/128699
PCT Pub. Date: Oct. 30, 2008

(65) Prior Publication Data
US 2010/0109393 A1 May 6, 2010

(30) Foreign Application Priority Data
Apr. 23, 2007 (DE) .......................... 10 2007 019 348

(51) Int. Cl.
*B60N 2/24* (2006.01)
(52) U.S. Cl. .................. 297/14; 297/217.7; 297/452.39; 182/127; 182/187
(58) Field of Classification Search .................. 297/14, 297/217.7, 273, 452.39; 182/127, 150, 187; 248/214, 235
See application file for complete search history.

(56) References Cited

U.S. PATENT DOCUMENTS

| 2,503,602 | A | * | 4/1950 | Titley | 248/210 |
| 2,829,702 | A | * | 4/1958 | Keating | 297/183.9 |
| 2,881,039 | A | * | 4/1959 | Waldemar | 297/163 |
| 4,005,765 | A | | 2/1977 | Reilly | |
| 4,770,373 | A | * | 9/1988 | Salo | 244/137.4 |
| 5,427,344 | A | * | 6/1995 | Beauchemin | 182/187 |
| 5,439,074 | A | * | 8/1995 | Trout et al. | 182/187 |
| 5,443,018 | A | * | 8/1995 | Cromwell | 108/44 |
| 6,224,029 | B1 | * | 5/2001 | Marble et al. | 248/214 |
| 6,557,307 | B2 | * | 5/2003 | Reddig | 297/162 |
| 7,080,417 | B2 | * | 7/2006 | Jiang | 297/14 |

FOREIGN PATENT DOCUMENTS
DE 102004062350 5/2006
* cited by examiner

*Primary Examiner* — Peter R. Brown
(74) *Attorney, Agent, or Firm* — Robert W. Becker; Robert Becker & Associates

(57) ABSTRACT

A safety seat for land vehicles, aircraft and watercraft, including a sitting portion secured to two vertical support straps attached to a vehicle and disposed in the vicinity of the rear edge of the sitting portion. Each support strap is a strap sling stretched between vertically spaced-apart anchors on the vehicle and includes a front strap facing the seating portion and a rear strap spaced therefrom. A transverse rod near the rear sitting portion edge reaches into the intermediate space between front and rear straps and is secured in closed fixed loops situated on the rear straps. The sitting portion is braced against the strap slings via supports pivotably connected to side rods of the sitting portion and extending at an angle below the sitting portion to the straps slings. The supports, via a transverse bracing disposed at their lower ends, reach into the intermediate space between front and rear straps. This transverse bracing is supported in loose loops on the rear straps that permit vertical movement of the transverse bracing.

8 Claims, 3 Drawing Sheets

SAFETY SEAT HAVING A VERTICALLY ACTING, IMPACT-DAMPENING SUSPENSION

BACKGROUND OF THE INVENTION

The instant application should be granted the priority dates of Apr. 23, 2007, the filing date of the corresponding German patent application 10 2007 019 348.5 as well as PCT/EP2008/003065. the filing date of the International patent application PCT/EP2008/003065.

The present invention relates to a safety seat for land vehicles, aircraft and watercraft, and includes a sitting portion that is secured to two vertical support straps, each of which is attached to a vehicle and extends in the vicinity of the rear edge of the sitting portion.

A safety seat having the aforementioned features is known from DE 10 2004 062 350 B3. Here the sitting portion, which is embodied as a tension-resistant component, is respectively secured to vertical support straps, which are stretched between the vehicle roof and the vehicle floor, in that the sitting portion is secured to the vertical support straps by means of additionally provided lateral carrying straps that are connected to the vertical support straps and therewith form a strap framework for the support of the sitting portion. In this connection, the lateral carrying straps are comprised of a strap portion that extends from a lower fixed securement location along the side edges of the sitting portion to its front corner points, whereby from the front corner points of the sitting portion a respective further strap portion that extends at an angle relative to the vertical axis of the vehicle seat is guided back to an upwardly disposed, fixed securement location on the associated vertical support strap. Thus, the seating portion, which is embodied as a tension-resistant component, is placed in the strap framework that is formed of vertical support straps and carrying straps in such a way that the sitting portion automatically tensions the strap framework. In this connection, according to one embodiment the sitting portion can additionally be folded up in the strap framework, whereby the folding up is effected by raising the rear end of the sitting portion by means of a separate actuating cable.

The known safety seat has the drawback that the lateral carrying straps laterally hem in an occupant seated upon the safety seat, so that when the occupant stands up he or she can rise only toward the front and can also only be seated upon the seat from a position standing in front of the seat. However, there are frequently applications where a plurality of seats are disposed next to one another in a row oriented in the direction of travel of the vehicle, whereby in particular when disembarking, the occupants slide to the side over the seats that are disposed next to one another and leave the vehicle from the last seat of the row.

It is therefore an object of the present invention to improve a safety seat having the aforementioned general features in such a way that with a support of the sitting portion as before on a strap framework, no components are present toward the side of the sitting portion that would obstruct a movement of the occupant.

SUMMARY OF THE INVENTION

The basic concept of the present invention is that each support strap is embodied as a strap sling that is stretched between vertically spaced-apart anchors which are fixed to the vehicle, and includes a front strap that faces the sitting portion and a rear strap that is spaced therefrom, and that the sitting portion on the one hand, via a transverse rod or bracing that extends in the vicinity of the rear edge of the sitting portion, reaches into the intermediate space between the front straps and the rear straps, wherein the transverse rod is respectively secured in a stationary closed fixed loop situated on the rear strap, and the sling portion on the other hand is braced against the stretched strap slings via supports that are pivotably connected to side rods of the sitting portion and that extend in an inclined path below the sitting portion to the respective front strap, whereby the supports, via a transverse rod or bracing disposed at their lower ends, reach into the intermediate space between front strap and rear strap, whereby the transverse rod is respectively supported in a loose loop provided on the rear strap and enabling a vertical movement of the transverse rod.

The present invention has the advantage that no support straps that are continuously stretched between the roof of the vehicle and the floor of the vehicle are any longer required; rather, shorter support straps can be secured, in particular, on the side structure of a vehicle and extend from a mounting support, which is to be disposed only slightly above the surface of the sitting portion, to below the sitting portion up to a mounting support disposed in the vicinity of the floor of a vehicle. To the extent that the vehicle seat, via the transverse bracings that are respectively formed on the one hand in the rear region of the sitting portion and on the other hand at the end of the supports that carry the sitting portion, is supported at four points against the support straps that are disposed on both sides, a suitably great stability of the seat securement is ensured. In this connection, the stationary closed loops for the securement in position of the transverse bracing or rod formed on the sitting portion form the pivot bearing for a folding movement of the sitting portion by raising the front edge thereof, and this folding movement is made possible by the fact that on the one hand the supports are pivotably connected with the sitting portion, and on the other hand the lower loose loops for the support of the supports are embodied in such a way that a vertical movement of the transverse bracing of the supports held in these loose loops is possible.

The inventive manner of securement of the sitting portion on a strap framework provided in a vehicle advantageously ensures that impacts that act in the vertical direction, in other words in the "Z" direction, of a vehicle, and which are caused, for example, by mine explosions, are transmitted into the supports via the support straps, i.e. the strap slings. When the vehicle seat is loaded by a person sitting thereon, the supports in turn are supported in the lower loose loop on the support straps that are embodied as strap slings. There thus results in this region a compressive force onto the support straps, i.e. the strap slings. At the same time, by means of its securement in the upper fixed loop that is situated on the rear strap, the sitting portion exerts a pulling force and hence presses upon the front strap. An increase of the vertical forces acting upon the sitting portion 17 is therefore manifested in an only very slight vertical change in position of the sitting portion, yet, due to the inclined position of front straps and rear straps of the two strap slings that carry the sitting portion, in a significant deflection of front straps and rear straps in the horizontal direction. Since the strap slings are tensioned by means of a tensioning device, the tension in the strap slings is additionally increased due to the deflection, and thus in the horizontal direction an effective dampening of the originally vertically acting impacts results. With a lateral impact stressing of the vehicle, the described impact dampening, with the inventive securement of the sitting portion, acts in the same direction, yet with the opposite sign.

On the whole, with the inventive safety seat there are the further advantages that only a few, simple, and hence economical components are required, whereby known components and materials can be used or relied upon. The safety seat has an only small overall size and at the same time a low weight, and in the folded-up position of the sitting portion has a very flat configuration. At the same time, however, the safety seat is characterized by a high rigidity and a good loading capacity in all directions of load, and the safety seat is easy to retrofit in existing vehicles.

Pursuant to one embodiment of the invention, the sitting portion is provided with a frame having a front transverse rod, the rear transverse rod or bracing, and side rods that connect them. Pursuant to alternative embodiments of the invention, the rear transverse bracing can be embodied as a continuous transverse rod, or alternatively as short rod stubs that are disposed on the ends of the side rods and extend into the fixed loops.

In the same way, the transverse rod or bracing that is disposed or provided on the supports can be embodied as a continuous traverse rod that interconnects the two supports, or can be embodied as short rod stubs that are disposed on the ends of the supports and extend into the loose loops.

With regard to a stable, yet at the same time light construction, pursuant to an embodiment of the invention, the frame of the seat portion, and the supports, including their transverse bracing, can be made from a light metal tube having a suitable profiling.

A tensioning device can be provided for the application of a preload into the path of each strap sling.

BRIEF DESCRIPTION OF THE DRAWINGS

One embodiment of the invention will be described subsequently and is illustrated in the drawings, in which.

DESCRIPTION OF SPECIFIC EMBODIMENTS

Figure 1:
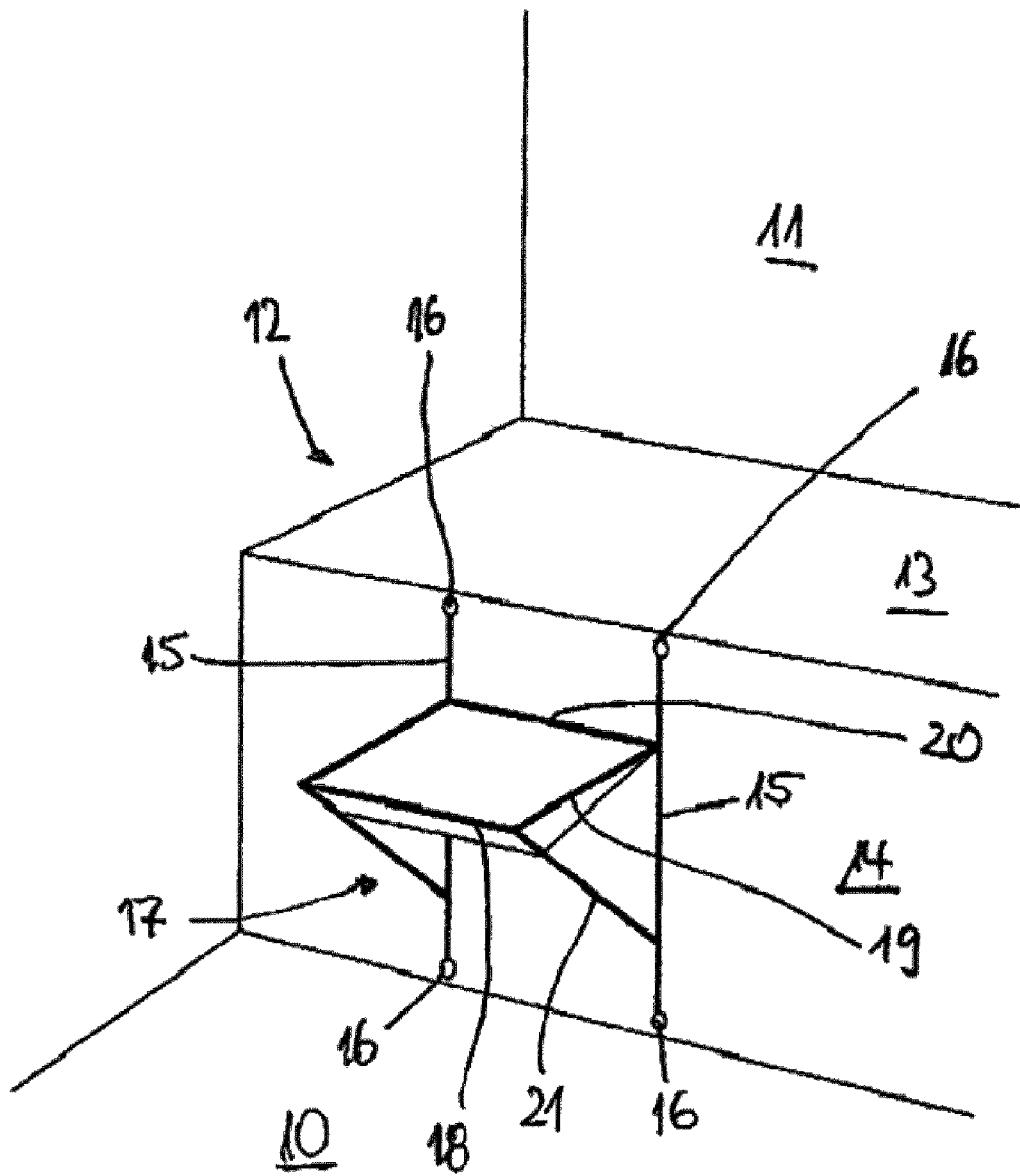
FIG. 1 is a partial interior view of a vehicle having a sitting portion that is secured to support straps mounted on the side structure of the vehicle.

As can be seen in FIG. 1, a vehicle, which is illustrated only schematically in a partial view, has a vehicle floor 10 as well as a side wall 11, on which is formed a wheel well or housing 12 having an upper surface 13 and a side structure 14. On the side structure 14, two parallel vertical support straps 15 are mounted on anchors 16 that are suitably secured to the vehicle; a sitting portion 17 is secured to the support straps in a manner to be described subsequently. The sitting portion 17 is comprised of a frame that extends about the seat surface and has a front transverse bar or rod 18, two side bars or rods 19 and a rear transverse bar or rod 20. Furthermore, supports 21 proceed from the underside of the side rods 19 and in an inclined path extend downwardly to the support straps 15 and are braced on the support straps 15.

Figure 2:
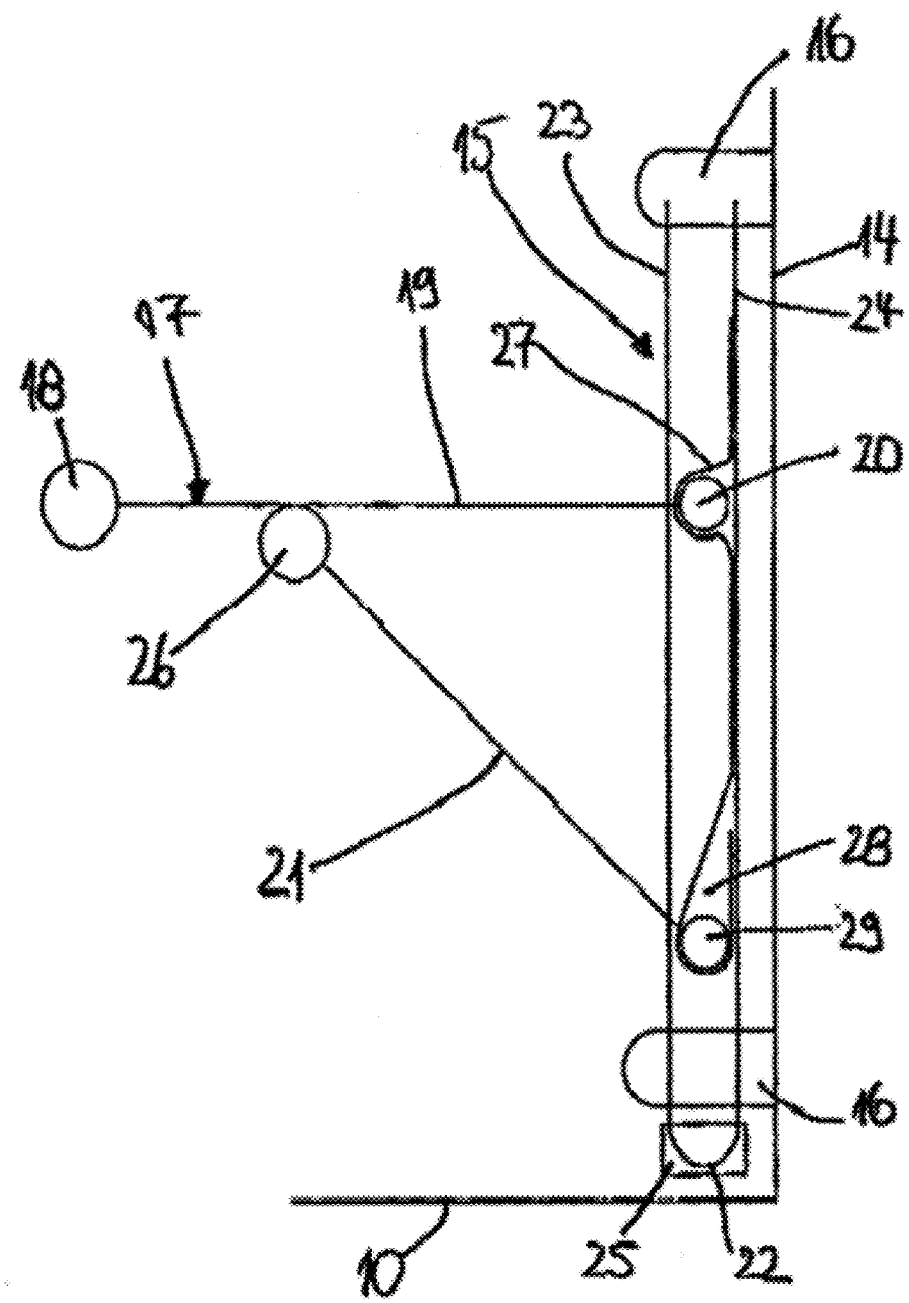
FIG. 2 is a schematic side view of the safety seat of FIG. 1 in its position of use.

As can be seen from FIG. 2, the support straps 15 are embodied as strap slings 22 that are guided through the anchors 16, which are disposed on the vehicle, and include a front strap 23, which faces the sitting portion 17, and a rear strap 24. To provide the strap slings 22 with the required tension, a respective tensioning device 25 is disposed in each strap sling 22.

The rear transverse rod 20 of the sitting portion 17 extends in the space present between the front strap 23 and the rear strap 24 of the strap slings 22, where it is held by a closed fixed loop 27 that is stationarily or immovably situated on the rear strap 24. The supports 21 are pivotably mounted on the side rods 19 of the sitting portion 17 by means of appropriately provided swivel joints 26, and are interconnected at their lower free ends via a continuous transverse bar or rod 29. In the same way as the rear transverse rod 20 of the sitting portion 17, the lower transverse rod 29 of the supports 21 is also disposed in the intermediate space between front strap 23 and rear strap 24, where is supported in a lower loose loop 28, which is also secured to the rear strap 24 and it is configured in such a way that a vertical movement of the transverse rod 29 in the loose loop 28 is possible.

Figure 3:
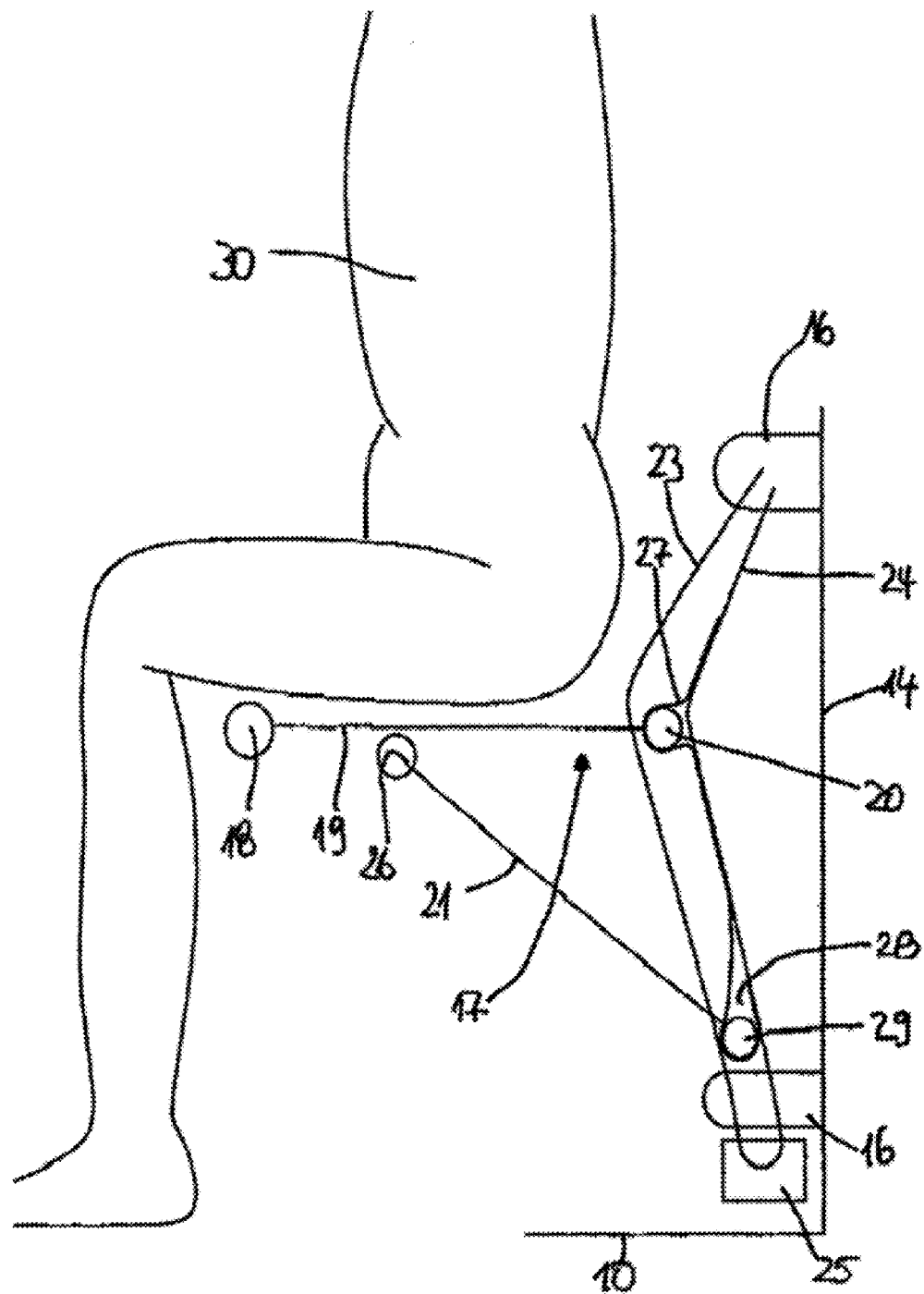
FIG. 3 shows the safety seat of FIG. 2 when loaded by a person seated thereon.

When the seat portion 17 is loaded by an occupant 30 sitting thereon, on the one hand the supports 21 are supported in the lower loose loops 28 against the rear straps 24 of the strap slings 22; at the same time, the sitting portion 17, due to the pivotable connection with the supports 21, exerts a pulling connection relative to the rear strap 24, so that by means of this type of support, the strap slings 22, which are initially pretensioned in a linear path (FIG. 2), are brought into a bent or angled-off path not only of its front strap 23 but also of its rear strap 24 (FIG. 3). If with this configuration of the support straps 15 vertically acting impacts are introduced, there results an increased bending-in of the strap slings, and hence an increase of the horizontally acting force components.

Although not illustrated, by being folded up the sitting portion can be brought into a space-saving position, whereby the sitting portion 17 pivots about the upper fixed loop 27, which acts as a pivot bearing, while the supports 21 can follow the vertical movement of their swivel joints 26, which are mounted on the sitting portion 17, by displacement in the lower loose loop 28.

The features of the subject matter of these documents disclosed in the preceding description, the patent claims, the abstract and the drawings, can be important individually as well as in any desired combination with one another for realizing the various embodiments of the invention.

The specification incorporates by reference the disclosure of German 10 2007 019 348.5 filed Apr. 23, 2009, as well as International application PCT/EP2008/003065 filed Apr. 17. 2008.

The present invention is, of course, in no way restricted to the specific disclosure of the specification and drawings, but also encompasses any modifications within the scope of the appended claims.

The invention claimed is:

1. A safety seat for land vehicles, aircraft and watercraft, comprising:
   a sitting portion and,
   two generally vertically extending support straps, each of which is adapted to be attached to a vehicle and is disposed in the vicinity of a rear edge of said sitting portion, wherein said sitting portion is secured to said support straps, further wherein each of said support straps is embodied as a strap sling that is stretched between vertically spaced-apart anchors that are fixed to the vehicle, further wherein said strap sling includes a front strap that faces the sitting portion and a rear strap that is spaced from said front strap, further wherein said sitting portion via a transverse rod or bracing that extends in the vicinity of the rear edge of said sitting portion, reaches into the intermediate space between said front straps and said rear straps, further wherein said transverse rod or bracing is secured in respective stationary closed fixed loops situated on said rear straps, further wherein said sitting portion is braced against said strap slings via supports that are pivotably connected to side rods of said sitting portion, further wherein said supports extend in an inclined path below said sitting portion to respective ones of said strap slings, further wherein said supports, via a further transverse rod or bracing that is disposed at lower ends of said supports which are remote from said pivotable connection to said side rods of said sitting portion, also reach into said intermediate space between said front straps and said rear straps, further wherein said further transverse rod or bracing is supported in loose loops respectively provided on said rear straps, and wherein said loose loops permit a vertical movement of said further transverse rod or bracing.

2. A safety seat according to claim 1, wherein said sitting portion is provided with a frame that includes a front transverse rod, said rear transverse rod or bracing, and said side rods, which connect said front transverse rod and said rear transverse rod or bracing.

3. A safety seat according to claim 2, wherein said rear transverse rod or bracing is embodied as a continuous transverse rod.

4. A safety seat according to claim 2, wherein said rear transverse rod or bracing is embodied as short rod stubs that are disposed on ends of said side rods and extend into said stationary fixed loops.

5. A safety seat according to claim 2, wherein said frame of said sitting portion and said supports, including said further transverse rod or bracing thereof, are respectively comprised of a light metal tube having a suitable profiling.

6. A safety seat according to claim 1, wherein said further transverse rod or bracing that is disposed on said supports is embodied as a continuous transverse rod that interconnects said supports.

7. A safety seat according to claim 1, wherein said further transverse rod or bracing that is disposed on said supports is embodied as short rod stubs that are disposed on ends of said supports and extend into said loose loops.

8. A safety seat according to claim 1, wherein a tensioning device is provided for applying a preload into the path of each of said strap slings.

* * * * *